United States Patent
Magnuson-Skeels et al.

(10) Patent No.: US 12,413,811 B2
(45) Date of Patent: Sep. 9, 2025

(54) PREDICTING FUTURE VIEWERSHIP

(71) Applicant: Samba TV, Inc., San Francisco, CA (US)

(72) Inventors: Bonnie Magnuson-Skeels, Sandy, UT (US); Greg Shinault, Berkeley, CA (US); Derek Damron, San Francisco, CA (US); Claire Tang, San Francisco, CA (US)

(73) Assignee: Samba TV, Inc., San Francisco, CA (US)

( * ) Notice: Subject to any disclaimer, the term of this patent is extended or adjusted under 35 U.S.C. 154(b) by 155 days.

(21) Appl. No.: 17/720,995

(22) Filed: Apr. 14, 2022

(65) Prior Publication Data
US 2022/0337903 A1    Oct. 20, 2022

Related U.S. Application Data

(60) Provisional application No. 63/174,863, filed on Apr. 14, 2021.

(51) Int. Cl.
*H04N 21/442*    (2011.01)
*H04N 21/45*    (2011.01)

(52) U.S. Cl.
CPC . *H04N 21/44204* (2013.01); *H04N 21/44213* (2013.01); *H04N 21/4532* (2013.01)

(58) Field of Classification Search
CPC ....... H04N 21/44204; H04N 21/44213; H04N 21/4532; H04N 21/23418; H04N 21/251; H04N 21/44222
See application file for complete search history.

(56) References Cited

U.S. PATENT DOCUMENTS

| | | | | |
|---|---|---|---|---|
| 9,432,471 | B1 * | 8/2016 | Boshy | H04L 67/02 |
| 2008/0300965 | A1 * | 12/2008 | Doe | G06Q 30/0204 |
| | | | | 705/7.33 |
| 2013/0243402 | A1 * | 9/2013 | Kummer | H04N 21/4334 |
| | | | | 386/297 |
| 2013/0311478 | A1 * | 11/2013 | Frett | G06Q 30/0241 |
| | | | | 707/E17.014 |
| 2014/0165106 | A1 * | 6/2014 | Zaveri | H04N 21/44226 |
| | | | | 725/46 |
| 2016/0044119 | A1 * | 2/2016 | Wirth | H04L 67/02 |
| | | | | 709/204 |
| 2018/0020251 | A1 * | 1/2018 | Hull | H04N 21/23406 |
| 2018/0176633 | A1 * | 6/2018 | Yeo | G06F 3/0482 |
| 2018/0181994 | A1 * | 6/2018 | Papakostas | H04N 21/44227 |
| 2020/0221179 | A1 * | 7/2020 | Kim | H04N 21/4312 |

(Continued)

*Primary Examiner* — John W Miller
*Assistant Examiner* — Akshay Doshi
(74) *Attorney, Agent, or Firm* — Procopio, Cory, Hargreaves & Savitch LLP

(57) ABSTRACT

Approaches provide for predictive viewership associated with a device. Information associated with viewership by the device may be received over an interval. The received viewership information is merged with panel information to further generate merged information. The merged information is then aggregated at a predetermined increment to form aggregated date. The aggregated data can then be used as input training data to a model to generate probability of viewership by the device. One or more metrics associated with the predicted viewership can be tracked to evaluate model performance.

18 Claims, 8 Drawing Sheets

(56) References Cited

U.S. PATENT DOCUMENTS

| | | | |
|---|---|---|---|
| 2020/0226465 A1* | 7/2020 | Harrington | H04N 21/25808 |
| 2021/0076097 A1* | 3/2021 | Barbis | G06Q 30/0272 |
| 2021/0084375 A1* | 3/2021 | Park | H04N 21/4532 |
| 2022/0124141 A1* | 4/2022 | Ramanujam | H04L 43/0888 |
| 2022/0284499 A1* | 9/2022 | Dornadula | G06Q 30/0631 |

* cited by examiner

PREDICTING FUTURE VIEWERSHIP

This application claims priority under 35 U.S.C. 119(a) to U.S. Provisional Application No. 63/174,863, filed on Apr. 14, 2021, the content of which is incorporated herein in its entirety for all purposes.

TECHNICAL FIELD

Aspects of the example implementations relate to system and method associated with predictive viewership of content, such as in the context of dynamic ad insertion associated with content broadcasting.

RELATED ART

In the related art, various media contents are reviewed over devices by consumers. Content displayed on these devices may be interspersed with supplemental content, such as advertising. Full reach of advertising campaign is often ineffective for content providers, as viewership fluctuates over time and seasons on programs and networks. As such, content providers taking the broad approach in deploying campaigns suffer from inconsistent results. Based on the foregoing, an unmet need exists for more accurate and efficient campaign deployment.

SUMMARY

Aspects of the present disclosure involve an innovative computer implemented method for predicting a probability of viewership by a device. The method may include receiving, over an interval, information associated with the viewership by the device; merging the received information with information associated with one or more partnering devices, to generate merged information; aggregating the merged information at an increment to generate aggregated data; providing the aggregated data as training data to a first model, wherein the first model generates a score associated with a probability of viewership by the device; generating one or more metrics associated with first model output; and comparing the one or more metrics against a baseline model to track performance of the first model output.

Aspects of the present disclosure involve an innovative computer device for predicting a probability of viewership. The computer device may include a processor and memory including instructions that, when executed by the processor, cause the computing device to: receiving, over an interval, information associated with the viewership by the device; merging the received information with information associated with one or more partnering devices, to generate merged information; aggregating the merged information at an increment to generate aggregated data; providing the aggregated data as training data to a first model, wherein the first model generates a score associated with a probability of viewership by the device; generating one or more metrics associated with first model output; and comparing the one or more metrics against a baseline model to track performance of the first model output.

Example implementations may also include a non-transitory computer readable medium having a storage and processor, the processor capable of executing instructions for predicting a probability of viewership by a device.

BRIEF DESCRIPTION OF DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in related art approaches to controlling playback of media content.

In various embodiments, user devices that include devices such as televisions, monitors, wearable devices, smart phones, tablets, handheld gaming devices, and the like may include display elements (e.g., display screens or projectors) for displaying content such as consumer content. This content may be in the form of television shows, movies, live or recorded sporting events, video games, and the like. Typically, the devices are agnostic or cannot determine the type of content being rendered, but rather, merely operate to render and display the content as instructed. In various embodiments, the user devices may operate in tandem with other devices. For example, a television may be connected to a receiver, which may receive inputs from other devices such as set top boxes, gaming systems, multimedia streaming devices, and the like, which the receiver routes to the television for display to the consumer. As mentioned above, content displayed on these devices may be interspersed with supplemental content, such as advertising.

In various embodiments, the supplemental content may be designed in a manner that may cause a user to perform certain actions, such as purchasing an item, navigating to a website, watching other content, or the like. Content providers attempt to target or otherwise direct their supplemental content or advertising, which may also be referred to as targeted content, to viewing devices. This may be accomplished by associating targeted content with particular media content. However, content providers may have trouble accurately predicting the likelihood of success for targeted content, or measuring the success of a previous rollout of targeted content. Accordingly, systems and methods of the present disclosure are directed toward developing predictive viewership, which may allow content providers to better assess and evaluate the deployment timing of their supplemental content, which may lead to generations of improved strategies to more efficiently deploy resources.

Figure 1:
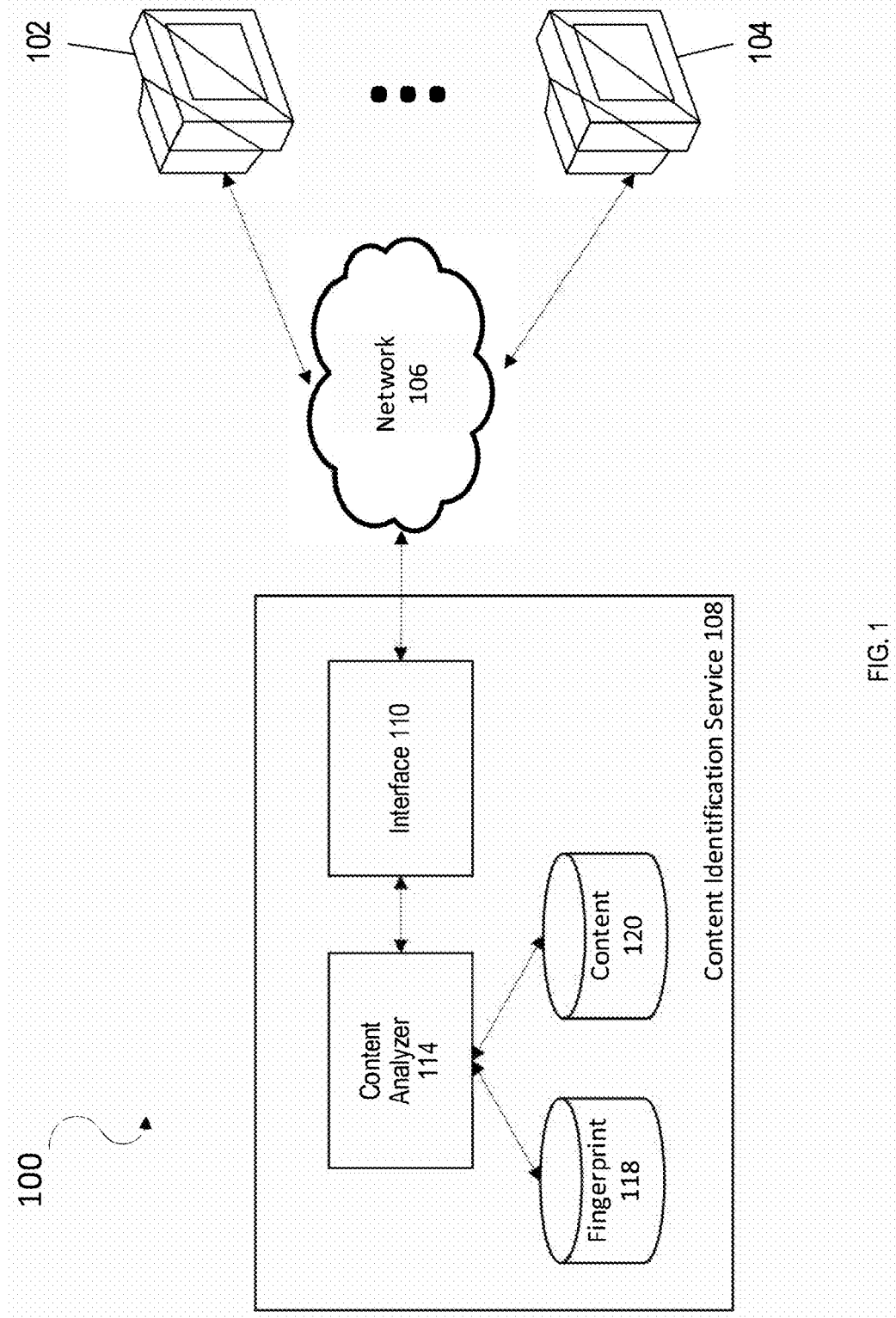
FIG. 1 illustrates an example environment in which aspects of the various example implementations can be utilized.

FIG. 1 illustrates an example environment 100 in which aspects of the various embodiments can be implemented. In this example, there are two different user devices 102 and 104, each displaying (or otherwise processing) different content at a specific point in time. These can be similar or different types of devices associated with the same or different users at similar or different geographic locations in accordance with the various embodiments. As discussed elsewhere herein, in various embodiments, the user devices 102, 104 can include software and/or hardware that performs at least some level or type of recognition for content consumed/viewed via those devices. Various user devices may have limited resources, such as limited memory or processing capability, that may be limited by physical characteristics or by a provider of the devices for use by third parties, among other such options. While the accuracy of the determinations may be less than would be possible without such constraints, the ability to aggregate content data from a large number of user devices can help to improve the determination accuracy.

In various embodiments, a user device may include an embedded chipset utilized to identify content being displayed on the user device, which may be referred to as Automatic Content Recognition (ACR). The chipset may be utilized to receive the content feed being transmitted to the user device, for example a streaming media feed or a feed from a set top box (STB). Furthermore, in various embodiments, the chipset may extract or otherwise identify certain frames from the media stream for later processing and recognition. Identification may be facilitated by using a fingerprint including a representation of features from the content.

For example, software may identify and extract features and compress the characteristic components, thereby enabling unique identification by the fingerprint. In various embodiments, a one-way hash of the fingerprint may be created, such as by using a Secure Hash Algorithm (SHA) or other such hashing algorithm or process. This hash may then be compared with a database of content to facilitate recognition. This database may include feature vectors and/or machine learning techniques to facilitate robust, quick matching.

It should be appreciated that multiple fingerprints may also be utilized in the identification process. In various embodiments, the fingerprints may be related to individual frames or images and/or auditory segments. In the example of FIG. 1, the information sent from the various user devices 102 and 104 can include the fingerprints generated by the various devices, which can then be used to perform the content recognition against a larger database than would otherwise be able to be stored on the individual user devices.

In the example environment 100 of FIG. 1, the data can be sent from the various devices 102 and 104 across at least one network 106, such as may include the Internet, a cellular network, a local area network, or the like. The types of network connections utilized can vary, depending at least in part upon the capabilities of the respective devices. The information can be received to an interface layer 110 that can include application programming interfaces (APIs) and other interfaces that enable requests to be received and directed accordingly. The interface layer 110 can include other components as well, such as firewalls, routers, network switches, and the like.

The user information can be provided to a content analyzer 114 in this example, which can take the received data and attempt to determine the corresponding content represented by the data. If the data includes one or more content fingerprints, then the content analyzer 114 can compare the fingerprint data against fingerprint data stored in a fingerprint repository 118 that is associated with specific instances of content. If the data includes other types of data, such as screen shots or feature vectors, that data might be compared against data in a content repository 120, where content determinations can be made using various image matching or computer vision processes. Various other approaches can be used as well as discussed and suggested herein.

In one embodiment, the components in the content identification service 108 of FIG. 1 can represent one of a number of capture stations, which might all be associated with the same provider or different providers in various embodiments. A capture station can receive feeds, streams, or broadcasts from multiple sources, as well as being able to receive fingerprints and other data from various user devices. A received stream in some embodiments can be divided or portioned into media segments. Data in the various segments can then be compared against data in one or more content repositories to attempt to identify the content.

In some embodiments, a database of content information can be maintained that can be used for content identification. This can include, for example, a set of fingerprints, as discussed above, that can be used for matching. Two fingerprints generated for an instance of content using the same fingerprinting algorithm should generate substantially the same fingerprint in at least some embodiments. As mentioned, different devices may recognize different features in the content that are used to generate the fingerprints, which can result in an incomplete match in various instances. Using a client-side implementation where the content is analyzed on the user device can ensure that the proper content is being processed, but can provide less accurate results as explained above. The user device can analyze the content as received to attempt to determine the presence of various live annotation events.

The data can indicate content that was detected on a stream or broadcast, or from another such source. It can indicate, for example, the content that was presented on a specific stream at a specific time, or can provide information as to all times and/or channels on which the content was displayed. The data can also provide information as to the number of viewings across all monitored sources over a period of time. However, the media can be analyzed on the individual devices, which can provide for some inaccuracies due to limited resources. In other instances, there may be adequate resources but the ability to access those resources is restricted so as to not interfere with the viewing experience or other types of functionality on the device. Various statistical analysis approaches can be utilized to determine the content provided to various user devices as specific points in time, or from specific sources, etc.

In some embodiments, an algorithm can process content information, such as a normalized content history (NCH), across various user devices. The NCH can include information for any user device that is consuming content and for which the information is provided or available. The information can be broken down by any appropriate metric, such as by channel, stream, or source. An instance of content can be analyzed to determine various features or aspects of the content, such as including specific images or image features, having specific identifiers, etc. In some embodiments, the information provided can be a fingerprint for the content, an identifier for the channel or source, and a timestamp, among other such options. The fingerprints can be used to identify the reported content.

Figure 2:
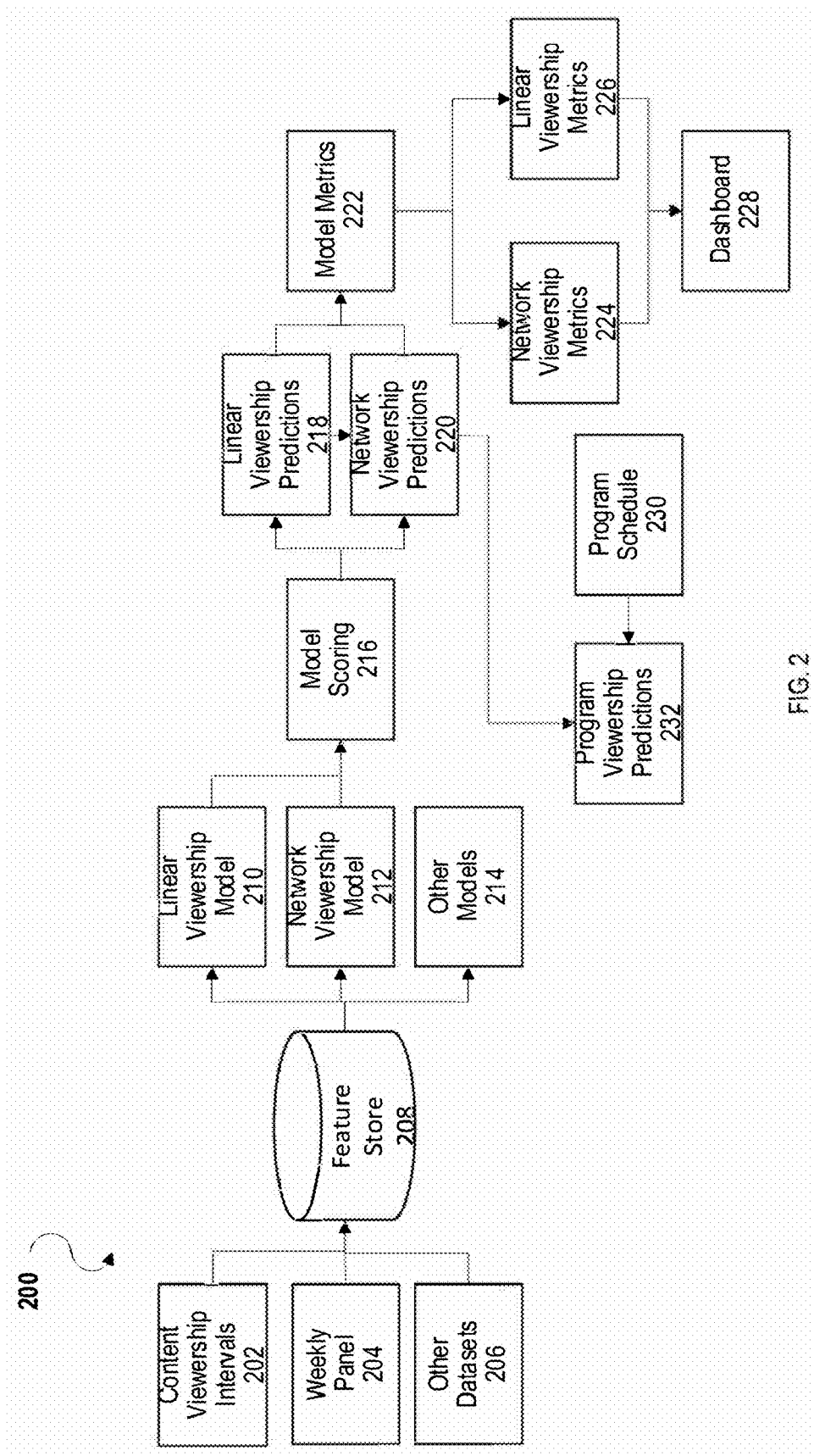
FIG. 2 illustrates an example process for generating predictive viewership that can be utilized in accordance with various example implementations.

FIG. 2 illustrates a process flow 200 representing a predictive viewership system in accordance to an embodiment. It should be noted that additional services, providers, and/or components can be included in such a system. Although some of the services, providers, components, etc. are illustrated as being separate entities and/or components, the illustrated arrangement is provided as an example arrangement and other arranged as known to one skilled in the art are contemplated by the embodiments described herein. Content information associated with a user device as depicted in FIG. 1 is captured in the content viewership intervals 202. The intervals track and describe data associated with viewership in adjustable intervals. In one embodiment, intervals are tracked every 30 minutes. However, the interval of 30 minutes is just an example, and other intervals may be used instead. The content information of content viewership intervals 202 may include encrypted device ID, viewing timestamp, scheduled timestamp, network name, program name, geolocation, and etc.

A list of partnering devices, or trusted devices, is included in the panel 204 and updated on a periodic basis (e.g. weekly). Devices are designated as trusted devices that belong to the panel 204 are devices known to provide consistently accurate content information. Designated devices belonging to the panel 204 are categorized by makes and models. By merging and cross-referencing content viewership intervals 202 with panel 204, this ensures accurate tracking of content viewership and generates high-quality training data. In addition to content viewership intervals 202 and weekly panel 204, other datasets 206 provide information associated with viewership that is not content based, which allow for additional features or data to be considered in training the various predictive models. Other datasets 206 may include additional data such as demographic data, location data, and affiliate data. Demographic data may include data such as age, gender, and ethnicity of member of the household, household income, political affiliation, education, and etc. Location data may include data such as country, time zone, state/region, metropolitan area, and etc. Affiliate data may include data such as network genre, network type (cable or broadcast), network number of regular viewers, and etc.

Feature store 208 aggregates data from content viewership intervals 202, weekly panel 204, and other datasets 206, at a predetermined increment, such as 30 minutes. In various embodiments, the predetermined increment can be adjusted between the range of a minute to an hour. The feature store 208 contains a list of features available for model training purposes. In addition, features of the feature store 208 can be selected or customized and inputted into the various training models, specifically, a linear viewership model 210 and a network viewership model 212, to be analyzed in various ways. In various embodiments, features can be shared across the different training models. The various features can be cached or stored in a database for future retrieval and include features such as number of networks viewed by a device in a recent time period, whether the household is of high-income household, network type, number of viewers of a network, network genre, time zone, whether women are present in the household, whether men are present in the household, whether children under the age of five are present in the household, and etc.

The linear viewership model 210 and the network viewership model 212 are trained to predict regularity. In various embodiments, the models are trained within a machine learning environment and are capable of generating viewership probabilities up to a few weeks in advance. Databricks™ is an integrated end-to-end machine learning environment for model training, feature development and management, and feature and model serving. While Databricks™ may be used as the training environment, however, other machine learning environments or platforms could be utilized to substitute Databricks™ for purpose of predictive training. In various embodiments, the models are trained using Gradient Boost Classifier, linear models, or neural networks. The linear viewership model 210 predicts the probability of a device being used for linear viewing. The network viewership model 212 predicts the probability of a network being selected for viewing when a device is used for linear viewing. In various embodiments, other models 214 can be included in addition to linear viewership model 210 and network viewership model 212. The other models 214 include models that predict the duration of device use, the probability of channel hopping during a session, whether the device will display OTT/streaming content or broadcast content, which OTT/streaming platform (e.g., Netflix™, Hulu™, etc.) a device will display, and etc.

Figure 3:
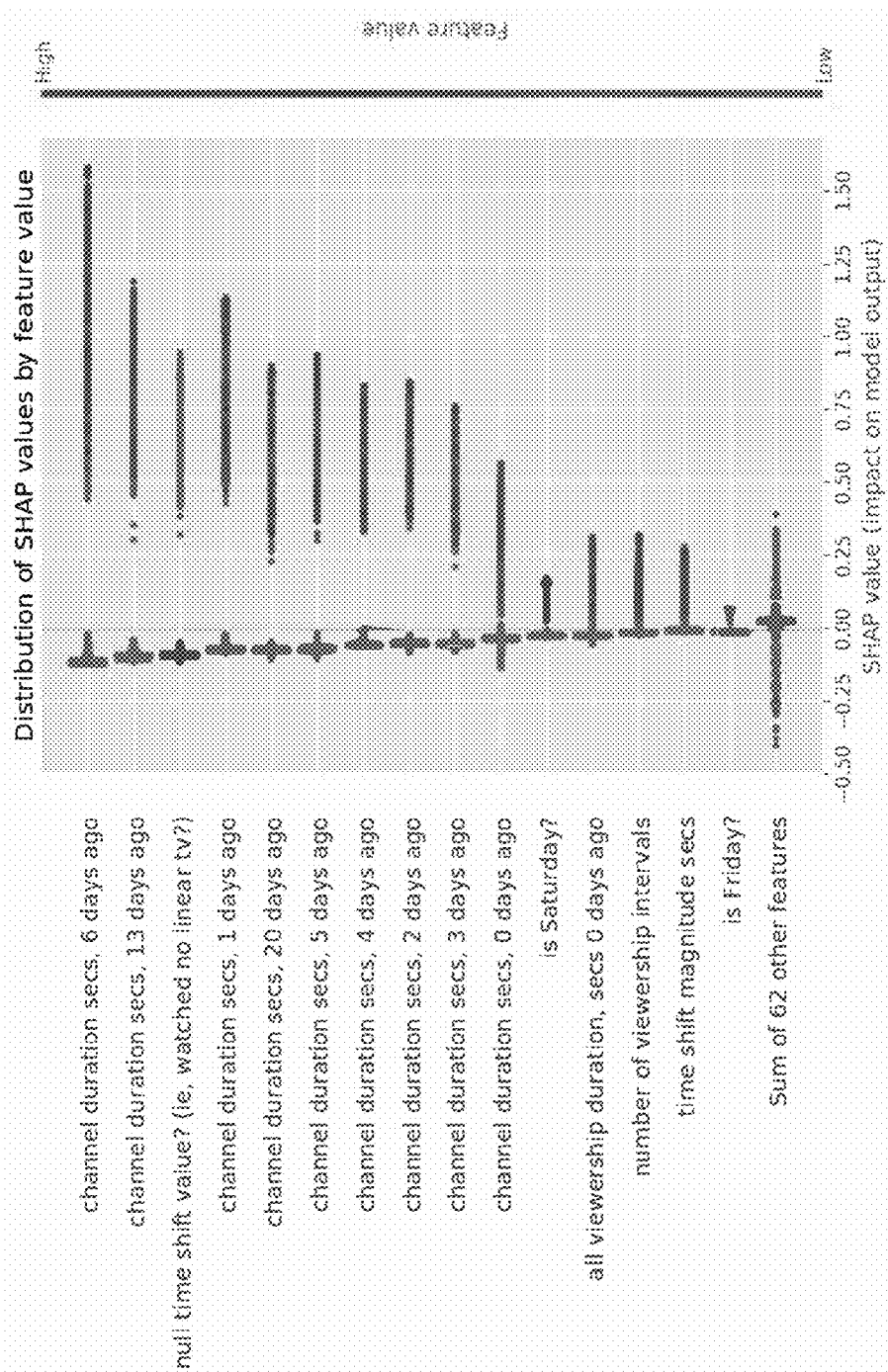
FIG. 3 illustrates an example model scoring that can be utilized in accordance with various example implementations.

Once the linear viewership model 210 and network viewership model 212 have been trained with the selected features from the feature store 208, the models are scored and examined for feature correlations at model scoring 216. In various embodiments, feature correlations are represented through Shapley Additive Explanation (SHAP) value violin plots, showing SHAP values associated with the selected features. FIG. 3 illustrates an example model scoring that can be utilized in accordance with various embodiments. The SHAP value violin plot illustrates the positive and negative relationships or impacts on an outcome. Each row represents a feature, and the features are permuted to examine the effect on the outcome of the model. Positive SHAP values indicate positive correlation of a feature on prediction, while negative SHAP values indicate negative correlation of a feature on prediction. Using the feature "channel duration secs, from 6 days ago" in FIG. 3 as an example, if the SHAP value increased, this tends to result in an increase in the predicted probability of a viewer watching linear television at the same time tomorrow. Similarly, if the SHAP value of the feature "channel duration secs, 3 days ago" is increased, this also results in an increase in the predicted probability of watching linear television at the same time tomorrow. However, that probability does not rise to the same level as the feature "channel duration secs, from 6 days ago" due to weekly patterns in television viewership.

Referring back to FIG. 2, on passing model scoring 216, modeled predictions are then generated based on the various models. Generated predictions can be separated into linear viewership predictions 218 and network viewership predictions 220. Linear viewership predictions 218 provide modeled predictions on the device being used for linear viewing, specifically, whether the device is used for viewing content. Network viewership predictions 220 provide modeled predictions on the network being viewed when a device is used for linear viewing. In various embodiments, linear viewership predictions 218 are generated to determine whether the device would be used for linear viewing and network viewership predictions 220 are generated after determining that the device is predicted to be viewed under linear viewership predictions 218.

After network viewership predictions 220 are generated, the network predictions can be overlaid with the program schedule 230 to generate program viewership predictions 232. Program schedule 230 contains programing timelines for each individual network. Program viewership predictions 232 provide modeled predictions on the program being viewed on the predicted network when the device is used for linear viewing.

Model metrics 222 are generated to track prediction performance by comparing predicted outputs from linear viewership predictions 218 and network viewership predictions 220 against actual device activities. Output from model metrics 222 can be further divided into network viewership metrics 224 and linear viewership metrics 226, to track prediction performance of network viewership and linear viewership, respectively. Sample metrics include but not limited to accuracy, precision, recall, F1, and etc.

Dashboard 228 monitors and evaluates metrics from network viewership metrics 224 and linear viewership metrics 226. The dashboard 228 allows for dashboard operators to monitor and control the overall health of the system. In various embodiments, dashboard 228 includes a display panel that outputs metrics data from network viewership metrics 224 and linear viewership metrics 226 for predictive performance monitoring and overall system health monitoring.

Metrics tracked on dashboard 228 include true/false positive/negative rates, accuracy, precision, recall, F1 score, calibration ratio, count/number of predicted devices, and etc., for evaluating tracked performances. The F1 score combines precision and recall into a single metric by determining their harmonic mean. In various embodiments, a naïve model is run on all tracked time periods to create baseline comparison. The naïve model is an estimating technique in which uses current value as forecast of the next period. For the naïve model, minimum amount of data manipulation is involved in generating a prediction, where current data is used to forecast future periods. Alternatively, values or data from the preceding period may be used as forecast for the same period in the future, such as using the current Tuesday's data as predictive data for next Tuesday.

Metrics tracking on the dashboard 228 is useful in determining whether a model has become out-of-date and needing to be retrained. Tracking of metrics for model calibration or retraining can be accomplished in two ways. First, when monitored metrics begin to fall below established thresholds on a regular basis, this triggers a retraining process of the model and recent data is introduced to calibrate the model's effectiveness. Second, observation in metrics decline can be utilized to establish a time period for which a model is expected to be valid. The same time period can then be established for regular retraining of the model to ensure effectiveness. At the same time, the metrics are also useful in continuing to refine/improve the existing models to evaluate performance levels between the various model versions.

Figure 4:
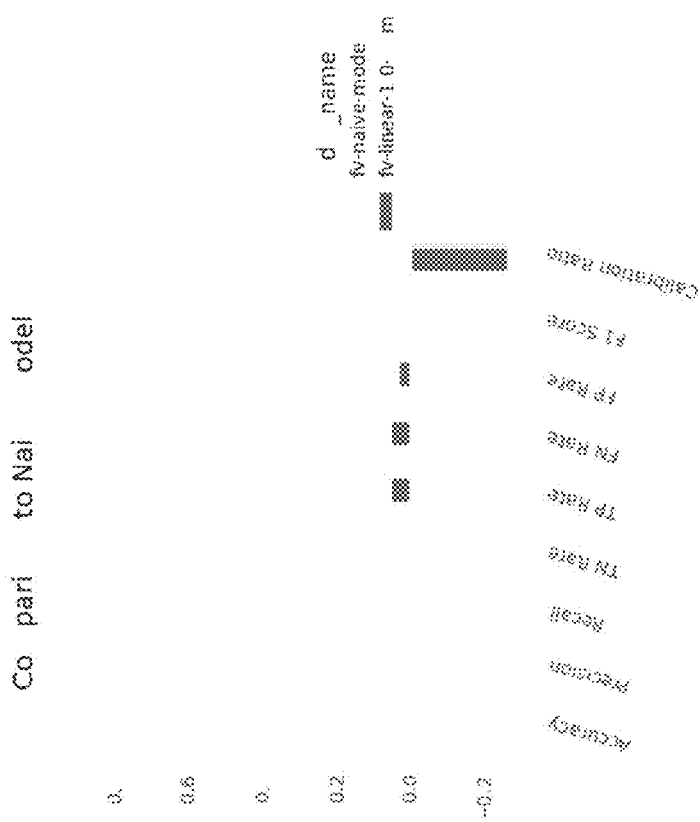
FIG. 4 illustrates a performance chart showing comparisons between performances of a naïve model and performances from predictive viewership models in accordance with various example implementations.

The foregoing example implementation may have various benefits and advantages. For example, but not by way of limitation, predicting whether a device is used to watch a program or a network at a certain time. Which in turn optimizes ad campaigning by allowing content provider to identify device users that are likely to have access to ad aired at certain time frame in the aggregate, and identify device users that are not likely to have access to the ad at the same time frame. This may in turn, allow the content provider to focus and prioritize digital marketing for those not likely to have access to the ad based on the prediction. Additionally, predictive viewership allows content providers to estimate to predict campaign exposure in the aggregate with various deployment tactics (e.g. frequency, length, and etc.) FIG. 4 illustrates a performance chart showing comparisons between a naïve model and performances from predictive viewership models shown in FIG. 2. In various embodiments, model evaluations and performance charts associated with the various model evaluations metrics can be retrieved and viewed from the dashboard 228. As shown in FIG. 4, performance levels associated with the predictive viewership models outperform those associated with the naïve model, with the single exception on recall. Another metric to examine would be the F1 score, which balances between precision and recall. The performance levels of the various metrics indicate a strong predictive viewership performance when compared to the baseline, and hence providing a more accurate and reliable model than the naïve model for content providers' campaign deployment.

Figure 5:
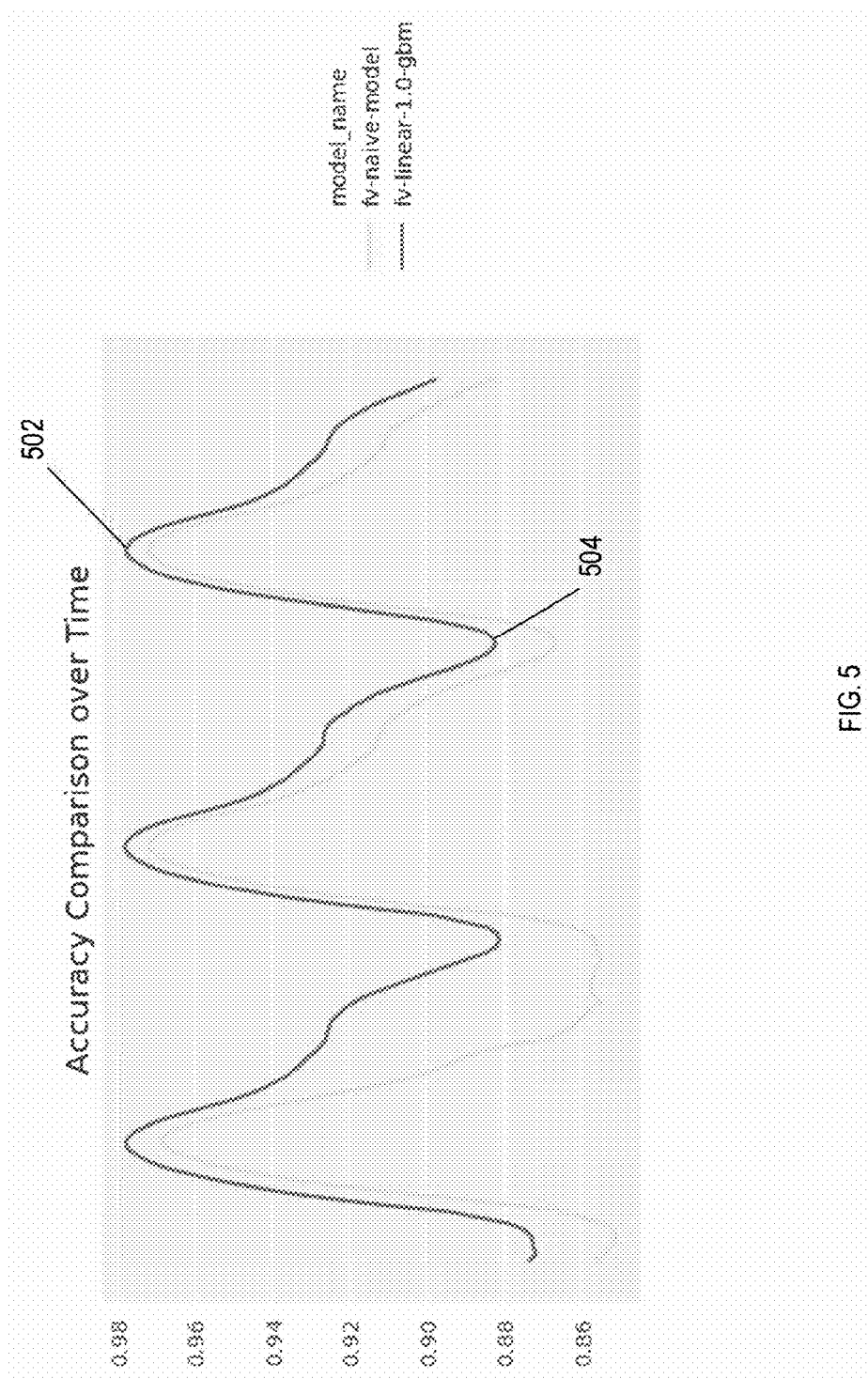
FIG. 5 illustrates a performance chart showing accuracy comparison between a naïve model and performances from predictive viewership models in accordance with various example implementations.

FIG. 5 illustrates a performance chart showing accuracy comparison between a naïve model and performances from predictive viewership models shown in FIG. 2. Performance charts associated with various model evaluation metrics can be retrieved from the dashboard 228. As shown in FIG. 5, the sample compares accuracy over a three-day period between the modeled outcome of a naïve model and the predictive viewership models. The peaks 502 are indicative of high accuracy and the valleys 504 are indicative of low accuracy of predictive viewership as compared with the baseline or naïve model. The peaks 502 align with overnight viewership and are seen as consistent between the two models. As can be observed, the valleys 504 immediately before the peaks 502 capture the prime-time viewership periods show significantly higher accuracy levels when compared to the naïve model. The various performance tracking metrics, in addition to the model scoring associated with viewership by the device, allow content providers to have a better insight of linear viewership, network viewership, as well as program viewership and allow for more effective deployment of campaigns.

Figure 6:
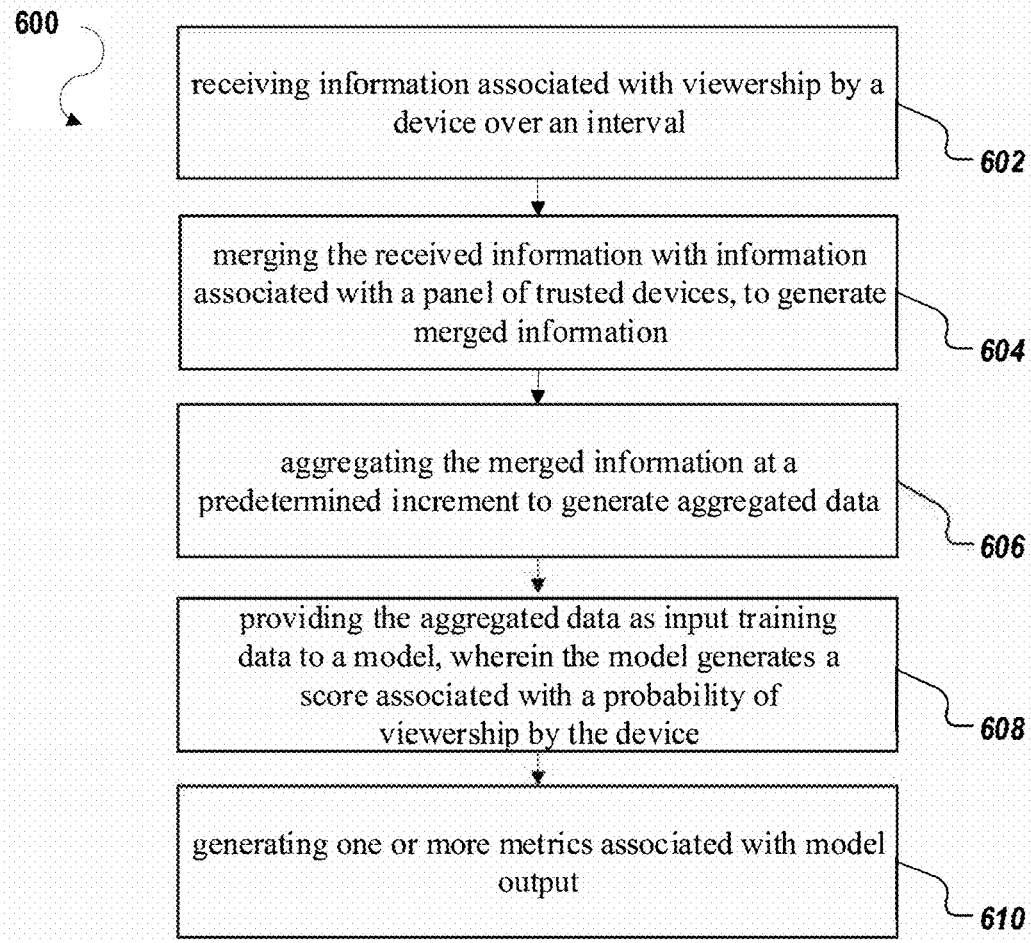
FIG. 6 illustrates an example process for generating predictive viewership in accordance with various example implementations.

FIG. 6 is a flow chart representing a method 600 for generating predictive viewership. The method 600 including receiving information associated with viewership by a device over an interval at 602. The received information can include content viewership information and additional datasets, such as other datasets of FIG. 2. For content viewership information, this corresponds to viewership information collected over the content viewership intervals 202 of FIG. 2. ACR technology may be utilized to identify content viewership information associated with devices within a household. The method 600 continues by merging the received information with information associated with a panel of trusted devices, to generate merged information at 604. A list of trusted partnering devices is included in the panel and updated on a periodic basis (e.g. weekly).

The merged information is then aggregated at an increment (e.g., predetermined) to generate aggregated data at 606. The aggregated data is then provided as input training data to a model. The model generates a score associated with a probability of viewership by the device at 608. The model can be a linear viewership model 210, which is scored for viewership probability as illustrated in FIGS. 2 and 3. At 610, one or more metrics associated with the model output, viewership predictions, is generated.

The method 600 may also include providing the aggregated data as input training data to a second model, such as network viewership model 212, to generate a model score associated with a probability of network viewership by the device, as illustrated in FIGS. 2 and 3. Once the linear viewership model outputs a prediction for linear device viewership, a network viewership prediction can be generated from the model scoring associated with network viewership model. In various embodiments, additional models may be utilized in viewership predictions.

Figure 7:
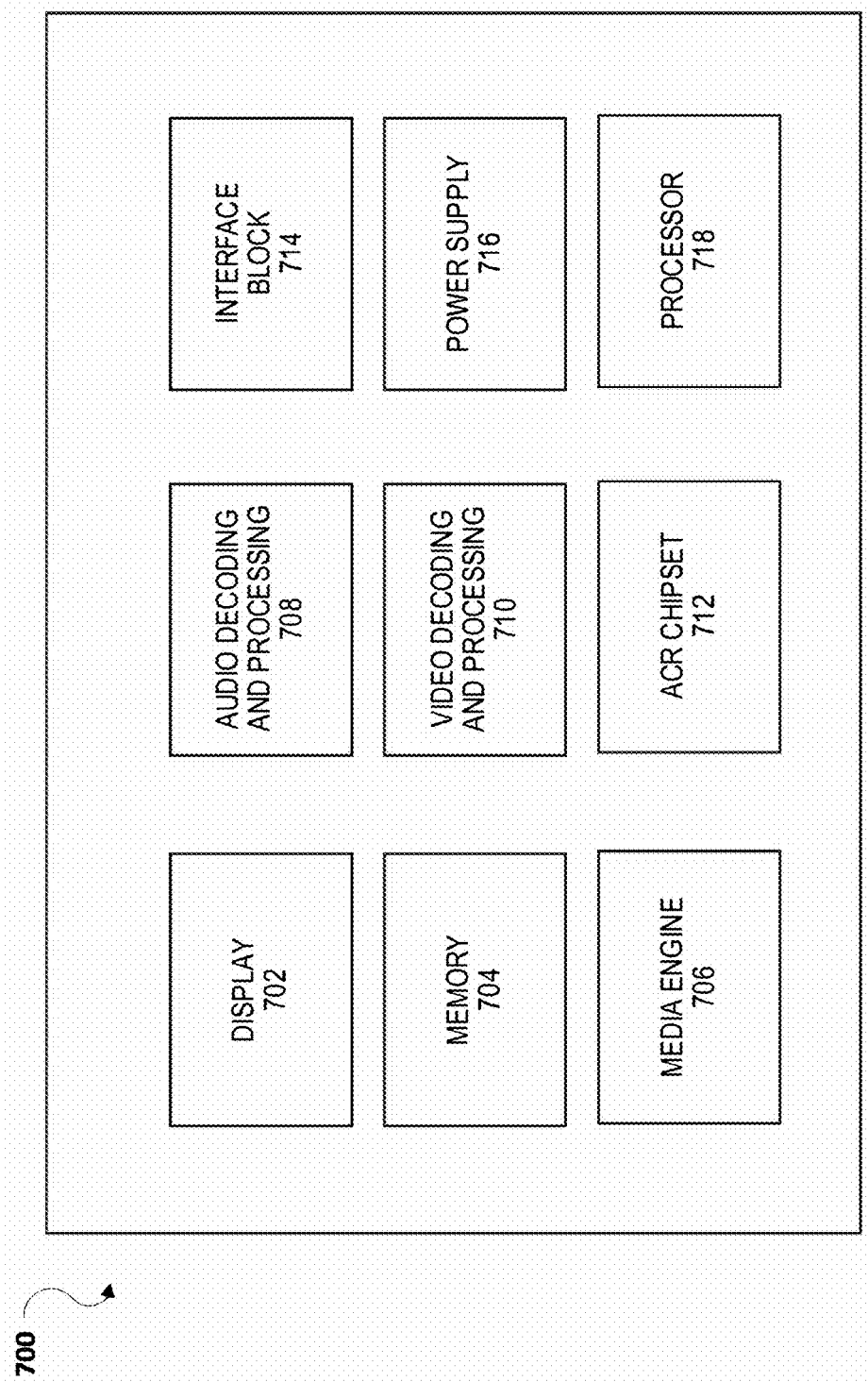
FIG. 7 illustrates components of an example user computing device that can be utilized in accordance with various example implementations.

FIG. 7 illustrates an example user device 700, which may include display elements (e.g., display screens or projectors) for displaying consumer content. User device 700 may correspond to user devices 102 and 104 in FIG. 1. In various embodiments, the user device 700 may be a television, smart phone, computer, or the like as described in detail above. In various embodiments, the illustrated user device 700 includes a display 702. As will be appreciated, the display may enable the viewing of content on the user device 700. The display may be of a variety of types, such as liquid crystal, light emitting diode, plasma, electroluminescent, organic light emitting diode, quantum dot light emitting diodes, electronic paper, active-matrix organic light-emitting diode, and the like. The user device 700 further includes a memory 704. As would be apparent to one of ordinary skill in the art, the device can include many types of memory, data storage or computer-readable media, such as a first data storage for program instructions for execution by the at least one processor.

In various embodiments, the user device 700 includes a media engine 706. As used herein, the media engine 706 may include an integrated chipset or stored code to enable the application of various media via the user device 700. For example, the media engine 706 may include a user interface that the user interacts with when operating the user device 700. Further, the media interface 706 may enable interaction with various programs or applications, which may be stored on the memory 704. For example, the memory 704 may include various third party applications or programs that facilitate content delivery and display via the user device 700.

In various embodiments, the user device 700 further includes an audio decoding and processing module 708. The audio decoding and processing module 708 may further include speakers or other devices to project sound associated with the content displayed via the user device 700. Audio processing may include various processing features to enhance or otherwise adjust the user's auditory experience with the user device 700. For example, the audio processing may include feature such as surround-sound virtualization, bass enhancements, and the like. It should be appreciated that the audio decoding and processing module 708 may include various amplifiers, switches, transistors, and the like in order to control audio output. Users may be able to interact with the audio decoding and processing module 708 to manually make adjustments, such as increasing volume.

The illustrated embodiment further includes the video decoding and processing module 710. In various embodiments, the video decoding and processing module 710 includes components and algorithms to support multiple ATSC DTV formats, NTSC and PAL decoding, composite and S-Video inputs, and 2D adaptive filtering. Further, high definition and 3D adaptive filtering may also be supported via the video decoding and processing module 710. The video decoding and processing module 710 may include various performance characteristics, such as synchronization, blanking, and hosting of CPU interrupt and programmable logic I/O signals. Furthermore, the video decoding and processing module 710 may support input from a variety of high definition inputs, such as High Definition Media Interface and also receive information from streaming services, which may be distributed via an Internet network.

As described above, the illustrated user device 700 includes the ACR chipset 712, which enables an integrated ACR service to operate within the user device 700. In various embodiments, the ACR chipset 712 enables identification of content displayed on the user device 700 by video, audio, or watermark cues that are matched to a source database for reference and verification. The ACR chipset 712 can be used to track information associated with viewership by the user device 700, which can then be sent for further processing, as illustrated in step 602 of FIG. 6.

In various embodiments, the ACR chipset 712 may include fingerprinting to facilitate content matching. The illustrated interface block 714 may include a variety of audio and/or video inputs, such as via a High Definition Media Interface, DVI, S-Video, VGA, or the like. Additionally, the interface block 714 may include a wired or wireless internet receiver. In various embodiments, the user device 700 further includes a power supply 716, which may include a receiver for power from an electrical outlet, a battery pack, various converters, and the like. The user device 700 further includes a processor 718 for executing instructions that can be stored on the memory 704.

The user device 700 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The user device 700 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Figure 8:
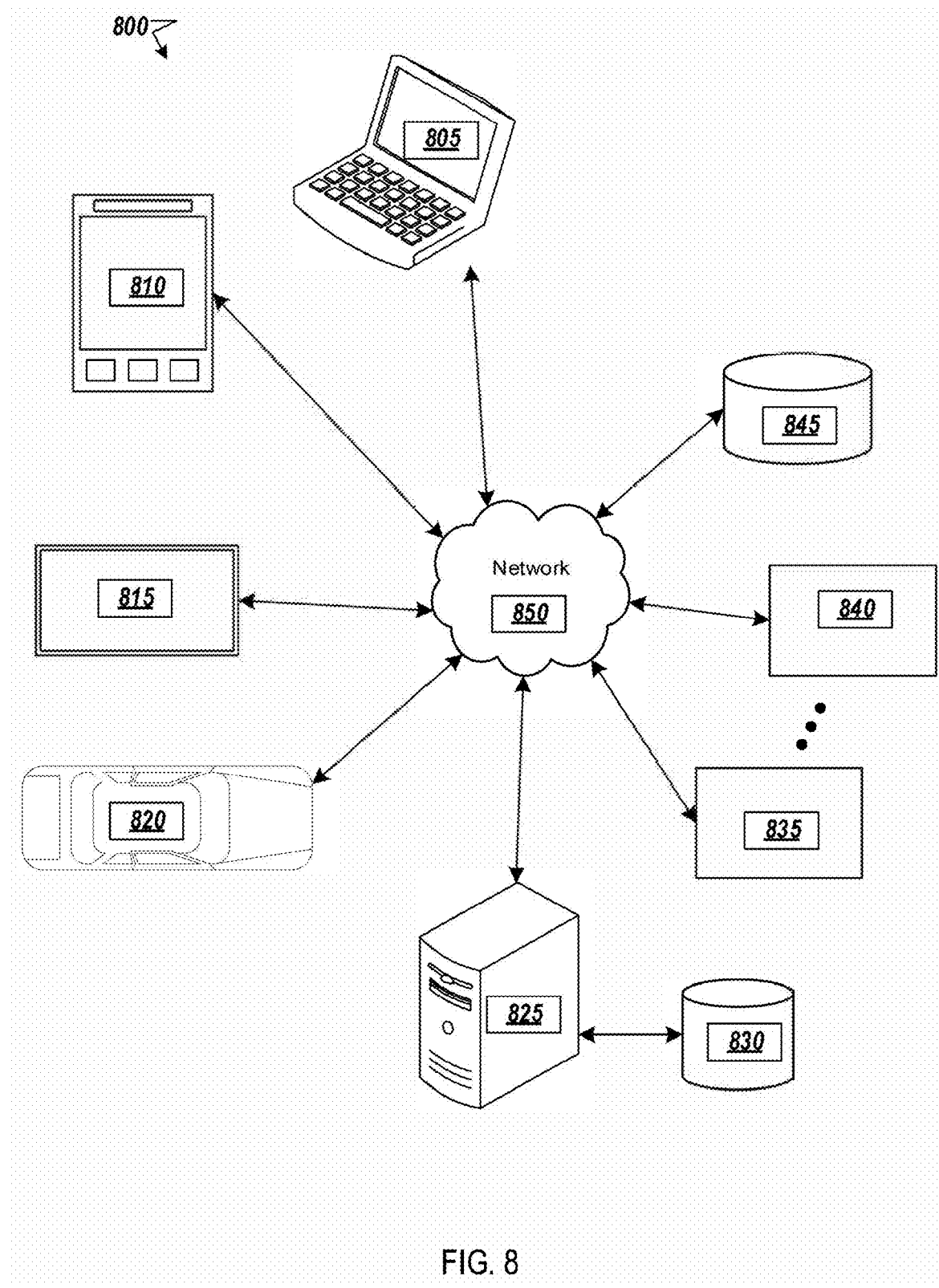
FIG. 8 illustrates an example environment suitable for some example implementations.

FIG. 8 illustrates an example environment suitable for some example implementations. Environment 800 includes devices 805-845, and each is communicatively connected to at least one other device via, for example, network 860 (e.g., by wired and/or wireless connections). Some devices may be communicatively connected to one or more storage devices 830 and 845.

An example of one or more devices 805-845 may be user device 700 described in FIG. 7, respectively. Devices 805-845 may include, but are not limited to, a computer 805 (e.g., a laptop computing device) having a monitor and an associated webcam as explained above, a mobile device 810 (e.g., smartphone or tablet), a television 815, a device associated with a vehicle 820, a server computer 825, computing devices 835-840, storage devices 830 and 845.

Based on the foregoing, systems and methods of the present disclosure provide more precise prediction of content viewership with feature optimization. This in turn, allows content providers to deploy their supplemental content more effectively knowing that deployment timing adhere closely to actual viewership based on the generated predictions. In addition, various metrics are monitored to track the system's overall health to ensure high level of confidence in the predicted outputs.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method of predicting a probability of viewership by a device, the method comprising:
   receiving, over an interval, information associated with the viewership by the device;
   merging the received information with source of content displayed on the device and information associated with one or more partnering devices to track content viewership and generate merged information;
   aggregating the merged information at an increment to generate aggregated data;
   providing the aggregated data as training data to a first model by selecting features of the aggregated data as the training data to train the first model, wherein the first model is trained to perform probability prediction of content viewership on the device;
   generating one or more metrics associated with first model output;
   comparing the one or more metrics against a baseline model generated from the aggregated data to track performance of the first model output;
   providing the selected features as input training data to train a second model as a network viewership model, wherein the second model is trained to perform probability prediction of network viewership on the device; and
   performing evaluation of the second model for feature correlations and generating a second model score based on the evaluation of the second model,
   wherein the probability prediction of the network viewership by the second model is performed only after the device is predicted to be viewed under the content viewership prediction as performed by the first model,
   wherein the one or more partnering devices are identified from a device list that is updated on a periodic basis, wherein the device list comprises a panel of devices that provide accurate content information, and the one or more partnering devices are categorized by make and model, and
   wherein the first model performs the probability prediction of the content viewership on the device.

2. The method of claim 1, wherein the receiving, over an interval, information associated with the viewership by the device comprises:
   receiving content viewership information by the device over the interval; and
   receiving additional datasets associated with viewership by the device over the interval.

3. The method of claim 2, wherein the content viewership information is generated by matching instances of device content associated with instances of fingerprint data using an automatic content recognition (ACR) process.

4. The method of claim 2, wherein the increment is a predetermined increment that is adjustable between a range of a minute and an hour.

5. The method of claim 1, wherein the device list is updated on a weekly basis.

6. The method of claim 1, further comprising:
   performing evaluation of the first model for feature correlations and generating a first model score based on the evaluation of the first model, wherein the first model score is represented by one or more Shapley Additive Explanation (SHAP) values.

7. The method of claim 1, wherein the one or more metrics comprises one or more network viewership metrics and content viewership metrics, and
   wherein the one or more metrics track prediction performance of the first model by comparing the first model output against actual device activity.

8. The method of claim 1, wherein the interval can be adjusted to between a minute and an hour.

9. The method of claim 1, further comprising:
   performing probability prediction of program viewership on the device by overlaying network viewership predictions as generated by the second model with program scheduling information.

10. A computer device, comprising:
    a processor; and
    memory including instructions that, when executed by the processor, cause the computing device to:
    receiving, over an interval, information associated with viewership by the device;
    merging the received information with information associated with one or more partnering devices to track content viewership and generate merged information;
    aggregating the merged information at an increment to generate aggregated data;
    providing the aggregated data as training data to a first model by selecting features of the aggregated data as the training data to train the first model, wherein the first model is trained to perform probability prediction of content viewership on the device;
    generating one or more metrics associated with first model output; and
    comparing the one or more metrics against a baseline model to track performance of the first model output,
    providing the selected features as input training data to train a second model as a network viewership model, wherein the second model is trained to perform probability prediction of network viewership on the device;
    performing evaluation of the second model for feature correlations and generating a second model score based on the evaluation of the second model,
    wherein the probability prediction of the network viewership by the second model is performed only after the device is predicted to be viewed under the content viewership prediction as performed by the first model,
    wherein the one or more partnering devices are identified from a device list that is updated on a periodic basis, wherein the device list comprises a panel of devices that provide accurate content information, and the one or more partnering devices are categorized by make and model, and
    wherein the first model performs the probability prediction of the content viewership on the device.

11. The computer device of claim 10, wherein the receiving, over an interval, information associated with the viewership by the device comprises:
    receiving content viewership information by the device over the interval; and
    receiving additional datasets associated with viewership by the device over the interval.

12. The computer device of claim 11, wherein the content viewership information is generated by matching instances of device content associated with instances of fingerprint data using an automatic content recognition (ACR) process.

13. The computer device of claim 11, wherein the increment is a predetermined increment that is adjustable between a range of a minute and an hour.

14. The computer device of claim 10, wherein the device list is updated on a weekly basis.

15. The computer device of claim 10, wherein the processor is further configured to:
   perform evaluation of the first model for feature correlations and generating a first model score based on the evaluation of the first model, wherein the first model score is represented by one or more Shapley Additive Explanation (SHAP) values.

16. The computer device of claim 10, wherein the one or more metrics comprises one or more network viewership metrics and content viewership metrics, and
   wherein the one or more metrics track prediction performance of the first model by comparing the first model output against actual device activity.

17. The computer device of claim 10, wherein the interval can be adjusted to between a minute and an hour.

18. The computer device of claim 10, further comprising:
   perform probability prediction of program viewership on the device by overlaying network viewership predictions as generated by the second model with program scheduling information.

* * * * *